United States Patent [19]

Kresheck

[11] Patent Number: 5,271,840
[45] Date of Patent: Dec. 21, 1993

[54] METHOD FOR SEPARATING HYDROPHILIC MOLECULES FROM HYDROPHOBIC MOLECULES VIA DETERGENT PARTITIONING

[75] Inventor: Gordon C. Kresheck, DeKalb, Ill.

[73] Assignee: Board of Regents on Behalf of Northern Illinois Univ., DeKalb, Ill.

[21] Appl. No.: 868,447

[22] Filed: Apr. 14, 1992

Related U.S. Application Data

[63] Continuation-in-part of Ser. No. 705,629, May 24, 1991, abandoned.

[51] Int. Cl.⁵ .............................................. B01D 11/04
[52] U.S. Cl. .................................... 210/634; 210/511
[58] Field of Search ............... 530/825; 210/632, 638, 210/634, 511

[56] References Cited

U.S. PATENT DOCUMENTS 5,098,997  3/1992  Anilionis et al. .................... 530/825

OTHER PUBLICATIONS

Bordier, "Phase Separation of Integral Membrane Proteins in Triton X-114 Solution", from J. of Biol. & Chem., Feb. 1981, pp. 1604–1607.

Kresheck, "Precipitous Effects of . . . Oxide Solutions", from Chem. & Physics of Lipids, 1981, pp. 69–81.

*Primary Examiner*—Frank Spear

[57] ABSTRACT

Aqueous mixtures of hydrophilic and hydrophobic molecules are separated by adding to the aqueous mixture a second aqueous solution containing 95 mole percent of an alkyldimethylphosphine oxide and 5 mole percent of a phospholipid at 0–10° C. followed by warming to 12–20° C. and separating the resulting two layers.

6 Claims, No Drawings

METHOD FOR SEPARATING HYDROPHILIC MOLECULES FROM HYDROPHOBIC MOLECULES VIA DETERGENT PARTITIONING

RELATED APPLICATIONS

The application is a continuation-in-part of my prior application, Ser. No. 07/705629, filed May 24, 1991, now abandoned.

FIELD OF THE INVENTION

This invention pertains to the separation of a mixture of molecules into discrete classes based upon solubility characteristics of the molecules. More specifically, detergent compositions and procedures are described which allow for efficient, non-destructive separation of molecules based on whether the molecules have hydrophilic or hydrophobic characteristics. As described in the following disclosure, this invention has particular utility for the separation of hydrophilic proteins from hydrophobic proteins or other hydrophobic molecules.

BACKGROUND OF THE INVENTION

Methods suitable for the purification of particular proteins are frequently derived on a trial and error basis. Invariably, nearly all schemes developed to purify a protein to homogeneity involve a series of methods and steps which may result in yield loss and/or loss of biological activity. An objective of this invention is to provide an efficient and selective means to facilitate the purification of proteins without significant loss of yield or biological activity.

A fairly recent method for facilitating protein purification has been described by C. Bordier in The Journal of Biological Chemistry vol. 256, no. 4, pp 1604–1607 (1981) and by G. Pryde and J. Phillips in Biochem. J. vol. 233, pp 525–533 (1986). In brief, the method described in the cited references above rely on the observation that solutions of the non-ionic detergent, Triton X-114, layers into a water immiscible second phase upon warming to about 30° C. The temperature at which a detergent begins forming a second, immiscible phase is defined by detergent chemists as the "cloud point." In the presence of a complex mixture of proteins, Triton X-114 may be warmed to 30–35 degrees C. whereupon hydrophilic proteins will remain with the water phase while hydrophobic proteins will migrate with the immiscible detergent phase. Use of this simple procedure to bring about separation and partial purification of proteins based on solubility and partitioning into a distinct second detergent phase has not gained widespread popularity due to the following disadvantages:

a) Due to a phenyl ring in its structure, Triton X-114 interferes with direct, spectral estimations of protein concentration.

b) Triton X-114 is not a definable, pure compound. Rather, it is a mixture containing various chain lengths of ethoxylated isooctylphenol. The use of undefined mixtures is not compatible with Good Manufacturing Practice (GMP) procedures often required for processing of pharmaceuticals.

c) Polyethoxylated nonionic detergents such as Triton X-114 frequently are contaminated or become contaminated with peroxides upon aging. This contaminant can be especially destructive to the biological integrity and activity of proteins (see H. Change and E. Bock in Anal. Biochem. vol. 104, pp 112–117 (1980).

d) In order to maintain solutions of Triton X-114 above the cloud point of 30 degrees, external heat must be continuously applied which adds mechanical complexity and further increases the risk of damaging certain sensitive proteins.

SUMMARY OF THE INVENTION

In brief, aqueous solutions of proteins being subjected to purification by the method of this invention are mixed at about 0–10° C. with a nonionic detergent mixture of an alkyldimethylphosphine oxide and a phospholipid, the oxide and the phospholipid being present in a mole ratio of about 95 to 5 respectively. Upon warming the protein/detergent mixture of this invention to 12–20°C., the homogeneous solution becomes initially turbid and layers out into two distinct, clear phases. The top, detergent phase, contains hydrophobic molecules while the bottom, water phase, contains hydrophilic molecules initially present in the mixture. Mechanical separation of the distinct phases at nominal room temperature effects the desired classification of molecules present in the original mixture on the basis of solubility in the detergent mixture.

The chemistry of solutions containing phosphine oxide detergents and phospholipids, and the effect of the latter on reducing cloud point, have been extensively studied, G. Kresheck, *Chemistry and Physics of Lipids*, 29 (1981) 69–81 and Basri and Kresheck, *Journal of Colloid and Interface Science*, Vol. 99, No. 2, (1984) 507–514. However, such solutions have not heretofore been used for protein isolation and purification.

The invention disclosed herein provides an improved method of protein isolation and partial purification which does not suffer the disadvantages inherent in heretofore described methods based on cloud point extraction with nonionic detergents. Those with ordinary skill in the art will recognize that the instant invention has utility for purification of complex mixtures of proteins regardless if the target protein is hydrophilic or hydrophobic. In the specific example cited below, one of the target proteins, bovine serum albumin, is hydrophobic with respect to the lower phase and partitions into the upper phase. An equally valuable application of the invention is removal of hydrophobic substances from a targeted hydrophilic protein. The cited examples that follow are, therefore, not intended to be limiting but to portray the best mode contemplated for carrying out the invention.

DETAILED DESCRIPTION OF THE INVENTION

EXAMPLE 1 PREPARATION/FORMULATION OF DETERGENT

Useful alkyldimethylphosphine oxides (APO) are those wherein the alkyl moiety is a straight chain, saturated aliphatic alkane having 8 to 24 carbon atoms. Preferred alkyldimethylphosphine oxides (APO) of this invention are when the alkyl moiety is decyl (to yield APO-10) or dodecyl (to yield APO-12). Both compounds are readily synthesized by the method of R. G. Laughlin as described in Journal of Organic Chemistry vol. 30, pp 1322–1324 (1965). A preferred phospholipid to employ when practicing this invention is commercially available, dimyristoyl phosphatidylcholine (DMPC). Working solutions of the detergent formulation of this invention are prepared by adding 67.8 mg of DMPC together with 468.2 mgs of APO-12 to 10 ml of distilled water at room temperature. The mixture is stirred and cooled to 0–4° C. whereupon a homogeneous solution of APO-12/DMPC results.

EXAMPLE 2 SEPARATION OF HYDROPHOBIC PROTEIN FROM HYDROPHILIC PROTEIN

In a small (3 ml capacity) conical vial was placed 1.0 ml of a phosphate buffered saline solution containing 1 mg each of bovine serum albumin (BSA) and B-lactoglobulin. The vial was then cooled to 0–4° C., and 1 ml of the APO-12/DMPC detergent formulation prepared in example 1 was added. The clear solution is allowed to warm to room temperature (about 20° C.) whereupon two distinct phases formed and layered out. The bottom or top phase was easily withdrawn with a pasteur pipette. Spectroscopic examination of the separated layers after warming reveals the proteins initially present were split between the lower and upper phases after warming. Determination of the total protein content in each layer by two independent methods $(OD)_{280}$ or (BCA) and circular dichroism confirmed the independent behavior of the partition coefficients for these two proteins, e.g., BSA was partitioned into the upper layer (80–95%) and B-lactoglobulin was found in the lower layer (60–85%). The molar ellipticity by circular dichroism of these two proteins was not altered by the extraction process indicating the absence of significant secondary structural changes due to the separation process.

What is claimed is:

1. A process for separating hydrophilic molecules from hydrophobic molecules comprising the steps;
    a) forming at about 0–10° C. an aqueous solution of the molecules to be separated with a mixed detergent of an alkyldimethylphosphine oxide wherein the alkyl moiety of the alkyldimethylphosphine oxide is a straight chain, saturated aliphatic alkane having 8 to 24 carbon atoms and a phospholipid, said oxide and phospholipid being present in a mole ratio of about 95 to 5 respectively,
    b) warming the resulting solution to about 12–20° C. and
    c) separating the resulting two phases.
2. The method of claim 1 wherein the molecules to be separated are proteins.
3. The method of claim 1 wherein the alkyl moiety is dodecyl.
4. The method of claim 1 wherein the alkyl moiety is decyl.
5. The method of claim 1 wherein the phospholipid is dimyristoyl phosphatidylcholine.
6. A process for separating hydrophilic molecules from hydrophobic molecules comprising the steps;
    a) forming at about 0–10° C. an aqueous solution of the molecules to be separated with a mixed detergent of an alkyldimethylphosphine oxide wherein the alkyl moiety of the alkyldimethylphosphine oxide is a straight chain, saturated aliphatic alkane having 8 to 24 carbon atoms and a phospholipid, said oxide and phospholipid being present in a mole ratio of about 95 to 5 respectively,
    b) warming the resulting solution to room temperature and
    c) separating the resulting two phases.

* * * * *